United States Patent [19]

Hirata et al.

[11] Patent Number: 5,925,184
[45] Date of Patent: Jul. 20, 1999

[54] CEMENT COMPOSITION

[75] Inventors: Tsuyoshi Hirata; Tsutomu Yuasa; Toru Uno; Koichiro Nagare, all of Kanagawa; Hideyuki Tahara, Osaka; Shogo Iwai, Kanagawa, all of Japan

[73] Assignee: Nippon Shokubai Co., Ltd., Japan

[21] Appl. No.: 08/803,759

[22] Filed: Feb. 21, 1997

[30] Foreign Application Priority Data

Feb. 22, 1996 [JP] Japan .................................. 8-034951
Feb. 22, 1996 [JP] Japan .................................. 8-034952

[51] Int. Cl.$^6$ ....................................... C04B 24/04
[52] U.S. Cl. ........................ 106/696; 106/724; 106/725; 106/727; 106/728; 106/802; 106/823
[58] Field of Search ................................ 106/696, 724, 106/802, 823, 725, 727, 728; 524/5

[56] References Cited

U.S. PATENT DOCUMENTS

| | | | |
|---|---|---|---|
| 4,946,904 | 8/1990 | Akimoto et al. | 106/724 |
| 5,362,323 | 11/1994 | Koyata et al. | 106/810 |
| 5,362,324 | 11/1994 | Cerulli et al. | 106/823 |
| 5,362,829 | 11/1994 | Kinoshita et al. | 526/240 |
| 5,567,236 | 10/1996 | Schapira et al. | 106/728 |
| 5,633,298 | 5/1997 | Arfaei et al. | 106/728 |
| 5,660,626 | 8/1997 | Ohta et al. | 106/728 |

FOREIGN PATENT DOCUMENTS

| | | |
|---|---|---|
| 0 331 308 A2 | 9/1989 | European Pat. Off. . |
| 0 612 702 A1 | 8/1994 | European Pat. Off. . |
| 0 725 043 A2 | 8/1996 | European Pat. Off. . |
| 6298555 | 10/1974 | Japan . |
| 1087542 | 3/1989 | Japan . |
| 5-310458 | 11/1993 | Japan . |
| 5-360152 | 11/1993 | Japan . |
| 6298556 | 10/1994 | Japan . |
| 7157348 | 6/1995 | Japan . |
| 07247150 | 9/1995 | Japan . |
| 8225354 | 9/1996 | Japan . |
| 8-268741 | 10/1996 | Japan . |

*Primary Examiner*—Paul Marcantoni
*Attorney, Agent, or Firm*—Fish & Richardson P.C.

[57] ABSTRACT

A cement composition excelling in the slump retaining property which comprises at least cement admixture comprising as a main ingredient thereof (I) a copolymer (A) of short-chain polyalkylene glycol (meth)acrylate (a), a long-chain polyalkylene glycol (meth)acrylate (b), a carboxylic acid monomer (c), and a monomer copolymerizable with the monomers mentioned above or a salt of the copolymer (B), (II) a copolymer ($A_1$) of the monomers (a), (c), and (d) mentioned above or a salt thereof, (III) a mixture of a copolymer ($A_1$) of the monomers (a), (c), and (d) mentioned above or a salt ($B_1$) of thereof with a known cement admixture, or (IV) a polycarboxylic acid based polymer ($A_3$) manifesting to a calcium sulfoaluminate based expansive additive an adsorption ratio of not less than 90% in 5 minutes at room temperature when added in an amount of 0.1% by weight as solids or a salt ($B_3$) thereof, or (V) a mixture of said polycarboxylic acid polymer with a known cement dispersant; cement; and water.

21 Claims, No Drawings

CEMENT COMPOSITION

BACKGROUND OF THE INVENTION

1. Field of the Invention

This invention relates to a cement composition. More particularly, it relates to a cement composition excelling in a slump retaining property capable of preventing the so-called cement compounds such as, for example, cement paste, mortar, and concrete from the degradation of flowability by aging.

2. Description of the Prior Art

Since the early deterioration of concrete structures aroused a serious social issue in 1981, the necessity for enhancing the workability and durability of concrete by decreasing the unit water volume in concrete has been eagerly demanded. Among the ensuant endeavors toward satisfying this demand are counted such technical innovations as concern the cement dispersant, an agent capable of producing a huge effect on the quality and performance of the cement compounds.

Heretofore, the fluidifying method which comprises producing freshly mixed concrete having the fluidity (hereinafter described as "slump") thereof lowered by the incorporation of an AE agent or AE water-decreasing agent at a plant, transporting the freshly mixed concrete on a mobile concrete mixer to the site of concrete placement, and fluidifying the concrete in the mixer by the addition of a fluidifying agent and heightening the slump to a prescribed level has been in vogue. This method, however, has many problems such as, for example, the public nuisance caused by the noise and the waste gas which arise when the fluidifying agent added to the concrete is mixed by stirring in the mobile concrete mixer, the ascription of the responsibility for the quality of the produced fluidified concrete, and the conspicuous decline of the slump of the fluidified concrete by aging.

In the circumstances, various admixture producers have made energetic studies devoted to the development of a so-called high quality AE water decreasing agent which fits direct addition to the freshly mixed concrete at the concrete plant. At present, naphthalene type, aminosulfonic acid type, and polycarboxylic acid type high quality AE water decreasing agents are marketed. In all these high quality AE water decreasing agents available in the market, the polycarboxylic acid type high quality AE water decreasing agents have the outstanding feature of possessing the highest water decreasing ratio. They nevertheless are on a par with the other high quality AE water decreasing agents in occasionally failing to attain thorough preclusion of slump loss under such harsh use conditions as are encountered when the produced freshly mixed concrete is transported in the summer to a remote site of placement.

An object of this invention, therefore, is to provide a cement composition excelling in the slump retaining property.

SUMMARY OF THE INVENTION

The object mentioned above is accomplished by (I) a cement composition excelling in the slump retaining property which comprises at least a cement admixture comprising as a main ingredient thereof a first copolymer (A) derived from the composition of 5–90% by weight of a first polyalkylene glycol (meth) acrylate (a) represented by the general formula (1)

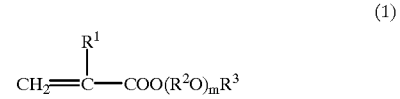

(1)

wherein $R^1$ is hydrogen atom or methyl group, $R^2O$ is one oxyalkylene group of 2–4 carbon atoms or a mixture of two or more such oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mols of oxyalkylene groups and represents an integer in the range of 1–97, 5–90% by weight of a second polyalkylene glycol (meth) acrylate (b) represented by the general formula (2)

(2)

wherein $R^4$ is hydrogen atom or methyl group, $R^5O$ is one oxyalkylene group of 2–4 carbon atoms or a mixture of two or more such oxyalkylene groups and, in the case of a mixture of two or more oxyalkylene groups, these groups may be added in a block form or a random form, $R^6$ is hydrogen atom or an alkyl group having 1–22 carbon atoms, and n is the average addition number of mols of oxyalkylene groups and represents an integer in the range of 4–100, providing that n satisfies the relations, $n \neq m$ and $n-m \geq 3$, 5–90% by weight of a carboxylic acid monomer (c) represented by the general formula (3)

(3)

wherein $R^7$ is hydrogen atom or methyl group and $M^1$ is hydrogen atom, a monovalent metal atom, a divalent metal atom, an ammonium group, or an organic amine group, and 0–50% by weight of other monomer (d) copolymerizable with the monomers mentioned above (providing that the total of the components (a), (b), (c), and (d) is 100% by weight) and/or a first copolymer salt (B) obtained by further neutralizing the copolymer (A) with an alkaline substance; cement; and water.

The object mentioned above is further accomplished by (II) a cement composition excelling in the slump retaining property which comprises at least a cement admixture comprising as a main ingredient thereof a mixture of a second copolymer $(A_1)$ derived from the composition of 5–65% by weight of a first polyalkylene glycol (meth) acrylate (a) represented by the general formula (1)

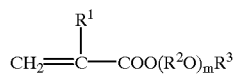

(1)

wherein $R^1$ is hydrogen atom or methyl group, $R^2O$ is one oxyalkylene group of 2–4 carbon atoms or a mixture of two or more such oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mols of oxyalkylene groups and represents an integer in the range of 1–97), 35–95% by weight of a carboxylic acid monomer (c) represented by the general formula (3)

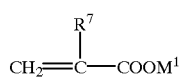

(3)

wherein $R^7$ is hydrogen atom or methyl group and $M^1$ is hydrogen atom, a monovalent metal atom, a divalent metal atom, an ammonium group, or an organic amine group, and 0–50% by weight of other monomer (d) copolymerizable with the monomers mentioned above (providing that the total of the components (a), (c), and (d) is 100% by weight) and/or a second copolymer salt ($B_1$) obtained by further neutralizing the copolymer ($A_1$) with an alkaline substance with a third copolymer ($A_2$) derived from the composition of 65–95% by weight of a second polyalkylene glycol (meth)acrylate (b) represented by the general formula (2)

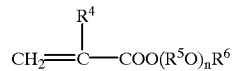

(2)

wherein $R^4$ is hydrogen atom or methyl group, $R^5O$ is one oxyalkylene group of 2–4 carbon atoms or a mixture of two or more such oxyalkylene groups and, in the case of a mixture of two or more oxyalkylene groups, these groups may be added in a block form or a random form, $R^6$ is hydrogen atom or an alkyl group having 1–22 carbon atoms, and n is the average addition number of mols of oxyalkylene groups and represents an integer in the range of 4–100, providing that n satisfies the relations, n≠m and n−m≧3), 5–35% by weight of a carboxylic acid monomer represented by the general formula (3)

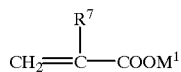

(3)

wherein $R^7$ is hydrogen atom or methyl group and $M^1$ is hydrogen atom, a monovalent metal atom, a divalent metal atom, an ammonium group, or an organic amine group, and 0–50% by weight of other monomer (d) copolymerizable with the monomers mentioned above (providing that the total of the components (b), (c), and (d) is 100% by weight) and/or a third copolymer salt ($B_2$) obtained by further neutralizing the copolymer ($A_2$) with an alkaline substance; cement; and water.

The object mentioned above is also accomplished by (III) a cement composition excelling in the slump retaining property which comprises at least a cement admixture comprising as main ingredients thereof a second copolymer ($A_1$) derived from the composition of 5–65% by weight of a first polyalkylene glycol (meth)acrylate (a) represented by the general formula (1)

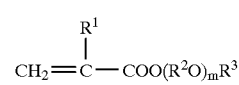

(1)

wherein $R^1$ is hydrogen atom or methyl group, $R^2O$ is one oxyalkylene group of 2–4 carbon atoms or a mixture of two or more such oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mols of oxyalkylene groups and represents an integer in the range of 1–97), 35–95% by weight of a carboxylic acid monomer (c) represented by the general formula (3)

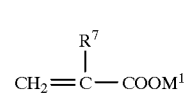

(3)

wherein $R^7$ is hydrogen atom or methyl group, and $M^1$ is hydrogen atom, a monovalent metal atom, a divalent metal atom, an ammonium group, or an organic amine group, and 0–50% by weight of other monomer (d) copolymerizable with the monomers mentioned above (providing that the total of the components (a), (c), and (d) is 100% by weight) and/or a second copolymer salt ($B_1$) obtained by further neutralizing the copolymer ($A_1$) with an alkaline substance and at least one kind of cement dispersant selected from the group consisting of a naphthalene based dispersant, an aminosulfonic acid based dispersant, polycarboxylic acid based dispersant, and lignin based dispersant; cement; and water.

The object mentioned above is also accomplished by (IV) a cement composition excelling in the slump retaining property which comprises at least a cement admixture comprising as a main ingredient thereof a polycarboxylic acid polymer ($A_3$) manifesting to a calcium sulfoaluminate based expansive additive an adsorption ratio of not less than 90% in 5 minutes at room temperature when said polymer added in an amount of 0.1% by weight as solids (based on the amount of the calcium sulfoaluminate based expansive additive) and/or a polymer salt($B_3$) obtained by further neutralizing the polymer ($A_3$) with an alkaline substance; cement; and water.

The object mentioned above is also accomplished by (V) a cement composition excelling in the slump retaining property which comprises at least a cement admixture comprising as a main ingredient thereof a polycarboxylic acid polymer ($A_3$) manifesting to a calcium sulfoaluminate based expansive additive an adsorption ratio of not less than 90% in 5 minutes at room temperature when said polymer added in an amount of 0.1% by weight as solids (based on the amount of the calcium sulfoaluminate based expansive additive) and/or a polymer salt($B_3$) obtained by further neutralizing the polymer ($A_3$) with an alkaline substance and at least one kind of cement dispersant selected from the group consisting of a naphthalene based dispersant, an aminosulfonic acid based dispersant, a polycarboxylic acid based dispersant, and a lignin based dispersant; cement; and water.

EXPLANATION OF THE PREFERRED EMBODIMENT

The first cement admixture to be used for the cement composition in accordance with this invention has as a main ingredient thereof a first copolymer (A) which will be specifically described herein below and/or a copolymer salt (B) obtained by further neutralizing the first copolymer (A) with an alkaline substance.

The first copolymer (A) mentioned above is derived from the composition of 5–90% by weight, preferably 5–70% by weight, more preferably 10–65% by weight of a first polyalkylene glycol (meth)acrylate (a) represented by the general formula (1), 5–90% by weight, preferably 10–90% by weight, more preferably 20–70% by weight of a second polyalkylene glycol (meth)acrylate (b) represented by the general formula (2), 5–90% by weight, preferably 5–40% by weight, more preferably 8–30% by weight of a carboxylic acid monomer (c) represented by the general formula (3), and 0–50% by weight, preferably 0–30% by weight, of other monomer (d) copolymerizable with the monomers mentioned above (providing that the total of the components (a), (b), (c) and (d) is 100% by weight). The first copolymer salt (B) mentioned above is obtained by further neutralizing the first copolymer (A) with an alkaline substance.

General formula (1)　　(1)

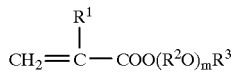

In the general formula (1), $R^1$ is hydrogen atom or methyl group, $R^2O$ is one oxyalkylene group of 2–4, preferably 2, carbon atoms or a mixture of two or more such oxyalkylene groups and, in the case of a mixture of two or more oxyalkylene groups, these groups may be added in a block form or a random form, $R^3$ is hydrogen atom or an alkyl group having 1–22, preferably 1–15 carbon atoms, and m is the average addition number of mols of oxyalkylene groups and represents an integer in the range of 1–97, preferably 1–10.

General formula (2)　　(2)

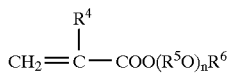

In the general formula (2), $R^4$ is hydrogen atom or methyl group, $R^5O$ is one oxyalkylene group of 2–4, preferably 2, carbon atoms or a mixture of two or more such oxyalkylene groups and, in the case of a mixture of two or more oxyalkylene groups, these groups may be added in a block form or a random form, $R^6$ is hydrogen atom or an alkyl group having 1–22, preferably 1–15 carbon atoms and n is the average addition number of mols of oxyalkylene groups and represents an integer in the range of 4–100, preferably 11–100, providing that n satisfies the relations, n≠m and n−m≧3, preferably n−m≧5

General formula (3)　　(3)

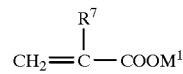

In the general formula (3), $R^7$ is hydrogen atom or methyl group, and $M^1$ is hydrogen atom, a monovalent metal atom, a divalent metal atom, an ammonium group, or an organic amine group.

The second cement admixture to be used for the cement composition in accordance with this invention has as a main ingredient thereof a mixture of the second copolymer ($A_1$) which will be described more specifically herein below and/or the second copolymer salt ($B_1$) obtained by further neutralizing the copolymer ($A_1$) with an alkaline substance with the third copolymer ($A_2$) which will be described more specifically herein below and/or the third copolymer salt ($B_2$) obtained by further neutralizing the third copolymer ($A_2$) with an alkaline substance.

The second copolymer ($A_1$) mentioned above is derived from the composition of 5–65% by weight, preferably 5–60% by weight, of a first polyalkylene glycol (meth) acrylate (a) represented by the general formula (1), 35–95% by weight, preferably 40–95% by weight, of a carboxylic acid monomer (c) represented by the general formula (3), and 0–50% by weight, preferably 0–30% by weight, of other monomer (d) copolymerizable with the components mentioned above (providing that the total of the components (a), (c), and (d) is 100% by weight). The second copolymer salt ($B_1$) mentioned above is obtained by further neutralizing the copolymer ($A_1$) with an alkaline substance.

The third copolymer ($A_2$) is derived from the composition of 65–95% by weight, preferably 70–95% by weight, of a second polyethylene glycol (meth)acrylate (b) represented by the general formula (2), 5–35% by weight, preferably 5–30% by weight, of a carboxylic acid monomer (c) represented by the general formula (3), and 0–50% by weight, preferably 0–3096 by weight, of other monomer (d) copolymerizable with the components mentioned above (providing that the total of the components (b), (c) and (e) is 100% by weight). The third copolymer salt ($B_2$) is obtained by further neutralizing the third copolymer ($A_2$) with an alkaline substance.

The weight ratio of the second copolymer ($A_1$) and/or the copolymer salt ($B_1$) to the third copolymer) ($A_2$) and/or the copolymer salt ($B_2$) is in the range of 1:99–99:1, preferably 3:97–97:3.

The third cement admixture to be used for the cement composition in accordance with this invention has as main ingredients thereof the second copolymer ($A_1$) mentioned above and/or the second copolymer ($B_1$) salt obtained by further neutralizing the copolymer ($A_1$) with an alkaline substance and at least one cement admixture selected from the group consisting of naphthalene based admixtures, aminosulfonic acid based admixtures, and polycarboxylic acid based admixtures.

The weight ratio of the second copolymer ($A_1$) and/or the copolymer salt ($B_1$) to the other cement admixture is in the range of 1:99–99:1, preferably 3:97–97:3.

The fourth cement admixture to be used for the cement composition in accordance with this invention has as a main ingredient thereof the polycarboxylic acid polymer ($A_3$) manifesting to a calcium sulfoaluminate based expansive additive an adsorption ratio of not less than 90% in 5 minutes at room temperature when said polymer added in an amount of 0.1% by weight as solids (based on the amount of the calcium sulfoaluminate type expansive additive) and/or the polymer salt ($B_3$) obtained by further neutralizing the polymer ($A_3$) with an alkaline substance.

The polycarboxylic acid polymer ($A_3$) is known in various forms including, for example, a copolymer derived from the composition of 35–95% by weight, preferably 40–95% by weight, of a carboxylic acid monomer (c) represented by the general formula (3), 5–65% by weight, preferably 5–60% by weight, of a first polyethylene glycol (meth) acrylate (a) represented by the general formula (1), and 0–50% by weight, preferably 0–30% by weight, of a monomer (d) copolymerizable with the monomers mentioned above (providing that the total of the components (c), (a), and (g) is 100% by weight).

The fifth cement admixture to be used for the cement composition in accordance with this invention has as main ingredients thereof the fourth cement admixture and at least one cement dispersant selected from the group consisting of a naphthalene based dispersant, an aminosulfonic acid based dispersant, a polycarboxylic acid based dispersant, and a lignin based dispersant.

The polyalkylene glycol (meth)acrylates (a) and (b) represented by the general formulas (1) and (2) which are used in this invention include short-chain polyalkylene glycol (meth)acrylates and long-chain polyalkylene glycol (meth) acrylates.

The short-chain polyalkylene glycol (meth)acrylates (a) include such (poly)oxyalkylene glycol mono(meth)acrylic esters as, for example, hydroxyethyl (meth)acrylate, hydroxypropyl (meth)acrylate, polyethylene glycol mono(meth) acrylate, (poly)propylene glycol mono(meth)acrylate, (poly) butylene glycol mono(meth)acrylate, (poly)ethylene glycol (poly)propylene glycol mono(meth)acrylate, (poly)ethylene glycol (poly)butylene glycol mono(meth)acrylate, (poly) propylene glycol (poly)butylene glycol mono(meth) acrylate, (poly)ethylene glycol (poly)propylene glycol (poly)butylene glycol mono(meth)acrylate, methoxy (poly) ethylene glycol mono(meth)acrylate, methoxy (polypropylene glycol mono(meth)acrylate, methoxy (poly) butylene glycol mono(meth)acrylate, methoxy (poly) ethylene glycol (polypropylene glycol mono(meth)-acrylate, methoxy (poly)ethylene glycol (poly)butylene glycol mono (meth)acrylate, methoxy (poly)propylene glycol (poly) butylene glycol mono(meth)acrylate, methoxy (poly) ethylene glycol (poly)propylene glycol (poly)butylene glycol mono(meth)acrylate, ethoxy (poly)ethylene glycol mono(meth)acrylate, ethoxy (poly)propylene glycol mono (meth)acrylate, ethoxy (poly)butylene glycol mono(meth) acrylate, ethoxy (poly)ethylene glycol (poly)propylene glycol mono(meth)acrylate, ethoxy (poly)ethylene glycol (poly)-butylene glycol mono(meth)acrylate, ethoxy (poly) propylene glycol (polybutylene glycol mono(meth)acrylate, and ethoxy (poly) ethylene glycol (poly) propylene glycol (poly) butylene glycol mono(meth)acrylate.

It is important that polyalkylene glycol (meth)acrylate (a) has a hydrophobic moety in a short-chain polyalkylene glycol as a side chain. Further it is preferable to contain ethylene glycol unit in the side chain in respect of the easiness of copolymerization. Average addition mol number (m) of the alkylene glycol chain in (alkoxy) polyalkylene glycol (meth)acrylate (a) is 1–95, preferably 1–10.

The long-chain polyalkylene glycol type monomers (b) which are used in this invention are represented by the general formula (2). They include such polyoxyalkylene glycol mono (meth) acrylic esters as, for example, polyethylene glycol mono(meth)acrylate, polyethylene glycol (poly)propylene glycol mono(meth)acrylate, polyethylene glycol (poly)butylene glycol mono(meth)acrylate, polyethylene glycol (poly)propylene glycol (poly)butylene glycol mono(meth)acrylate, methoxy polyethylene glycol mono (meth)acrylate, methoxy polyethylene glycol (poly) propylene glycol mono(meth)acrylate, methoxy polyethylene glycol (poly)butylene glycol mono(meth)acrylate, methoxy polyethylene glycol (poly)propylene glycol (poly) butylene glycol mono(meth)acrylate, ethoxy polyethylene glycol mono(meth)acrylate, ethoxy polyethylene glycol (poly)propylene glycol mono(meth)acrylate, ethoxy polyethylene glycol (poly)butylene glycol mono(meth)acrylate, and ethoxy polyethylene glycol (poly)propylene glycol (poly)butylene glycol mono(meth)acrylate.

In order to obtain high water reducing rate, it is important that cement particles are dispersed by stereo repulsation and hydrophilicity based on polyalkylene glycol chain having 4–100 of average addition mol number of polyalkylene glycol (meth)acrylate (b). Thus it is preferable to introduce many oxyethylene groups into the polyalkylene glycol chain. Average addition mol number (n) of the alkylene glycol chain in (alkoxy) polyalkylene glycol (meth)acrylate (b) is 4–100, preferably 11–100.

The carboxylic acid monomer (c) is represented by the general formula (3) mentioned above. As typical examples of the monomer (c), acrylic acid, methacrylic acid, and monovalent metal salts, divalent metal salts, ammonium salts, and organic amine salts of such acids may be cited. These carboxlic acid monomers may be used either singly or in the form of a mixture of two or more members.

The monomer (d) is a monomer which is copolymerizable with the monomers (a), (b), and (c). As typical examples of the monomer (d), diesters of such dicarboxylic acids as maleic acid, fumaric acid, citraconic acid, mesaconic acid, and itaconic acid with such alcohols as are represented by $HO(R^8O)pR^9$, wherein $R^8O$ is one oxyalkylene group of 2–4 carbon atoms or a mixture of two or more such oxyalkylene groups and, in the case of a mixture of two or more oxyalkylene groups, these groups may be added in a block form or a random form, P is the average addition number of mols of oxyalkylene groups and represents an integer in the range of 1–100, and $R^9$ is a hydrogen atom or an alkyl group of 1–22, preferably 1–15 carbon atoms); unsaturated amides such as (meth) acryl amide and (meth)acryl alkyl amide; vinyl esters such as vinyl acetate and vinyl propionate; unsaturated sulfonic acid such as vinyl sulfonic acid, (meth) allyl sulfonic acid, sulfoethyl (meth)acrylate, 2-methyl propane sulfonic acid (meth)acryl amide, and styrene sulfonic acid and monovalent metal salts, divalent metal salts, ammonium salts, and organic amine salts thereof; aromatic vinyls such as styrene and a-methyl styrene; ester of aliphatic alcohols of 1–18, preferably 1–15, carbon atoms or esters of such phenyl group-containing alcohols as benzyl alcohol with (meth) acrylic acids may be cited. These monomers may be used either singly or in the form of a mixture of two or more members.

The first copolymer (A) is derived from the composition of the monomers (a), (b), (c) and optionally (d) combined in a specific ratio mentioned above. As respects the mixing ratio of the monomers (a), (b), and (c), the proportion of the monomer (a) is in the range of 5–90% by weight, that of the monomer (b) in the range of 5–90% by weight, and that of the monomer (c) in the range of 5–90% by weight, preferably that of the monomer (a) in the range of 5–70% by weight, that of the monomer (b) in the range of 10–90% by weight, and that of the monomer (c) in the range of 5–40% by weight, more preferably that of the monomer (a) in the range of 10–65% by weight, that of the monomer (b) in the range of 20–70% by weight, and that of the monomer (c) in the range of 8–30% by weight. The proportion of the monomer (d) copolymerizable with the monomers mentioned above is not more than 50% by weight, preferably not more than 30% by weight. If these proportions deviate from the ranges mentioned above, the produced cement dispersant will not acquire such highly satisfactory properties as are aimed at.

For the production of the copolymer (A), it suffices to copolymerize the aforementioned monomers using a polymerization initiator. The copolymerization can be carried out by such methods as polymerization in a solvent or bulk polymerization.

The polymerization in a solvent can be performed batchwise or continuously. As typical examples of the solvent to be used in this polymerization, water; lower alcohols such as methyl alcohol, ethyl alcohol, and isopropyl alcohol; aromatic or aliphatic hydrocarbons such as benzene, toluene, xylene, cyclohexane, and n-hexane; ester compounds such as ethyl acetate; and ketone compounds such as acetone and methylethyl ketone may be cited. From the viewpoint of the solubility of the monomers to be used as the raw materials and the copolymer (A) to be produced and the convenience of the copolymer (A) during the course of use, it is appropriate to use at least one member selected from the group consisting of water and lower alcohols of 1–4 carbon atoms. Among other lower alcohols of 1–4 carbon atoms, methyl alcohol, ethyl alcohol, isopropyl alcohol, etc. prove particularly effective.

When the polymerization is carried out in water, a water-soluble polymerization initiator such as, for example, the persulfate of an alkali metal or ammonium, or hydrogen peroxide is used for initiating the polymerization. In this case, an promotor such as, for example, sodium hydrogen sulfite or Mohr's salt may be additionally used. When this polymerization is carried out in a lower alcohol, an aromatic hydrocarbon, an aliphatic hydrocarbon, an ester compound, or a ketone compound as the solvent, a peroxide such as benzoyl peroxide or lauroyl peroxide; hydroperoxide such as cumene hydroperoxide; or an aromatic azo compound such as azo-bis-isobutyronitrile is used as the polymerization initiator. In this case, an promotor such as an amine compound can be additionally used. When a water-lower alcohol mixed solvent is used, various polymerization initiators mentioned above or combinations of such polymerization initiators with accelerators mentioned above are available for proper selection. Though the polymerization temperature is properly determined depending on the kind of a solvent or a polymerization initiator to be used, it is generally selected in the range of 0–120° C.

The bulk polymerization is carried out by using a peroxide such as benzoyl peroxide or lauroyl peroxide; hydroperoxide such as cumene hydroperoxide; or an aliphatic azo compound such as azo-bis-isobutyronitrile as the polymerization initiator at a temperature in the range of 50–200° C.

A thiol type chain transfer agent may be additionally used in the polymerization for the purpose of adjusting the molecular weight of the copolymer (A) to be produced. The thiol type chain transfer agent to be used in this case is represented by the general formula, HS—$R^{10}$—Eg, wherein $R^{10}$ is an alkyl group of 1 or 2 carbon atoms, E is —OH, —$COOM^2$, —$COOR^{11}$, or —$SO_3M^2$ group, $M^2$ is hydrogen atom, a monovalent metal, a divalent metal, an ammonium group, or an organic amine group, $R^{11}$ is an alkyl group of 1–10 carbon atoms, and g is an integer of 1 or 2). As typical examples of the thiol type chain transfer agent, mercaptoethanol, thioglycerol, thioglycolic acid, 2-mercaptopropionic acid, 3-mercaptopropionic acid, thiomalic acid, octyl thioglycolate, and octyl 3-mercapto propionate may be cited. These thiol type chain transfer agents may be used either singly or in the form of a mixture of two or more members.

The copolymer (A) which is obtained as described above can be used in its unmodified form as a main ingredient for the cement admixture. This copolymer, when necessary, may be further neutralized with an alkaline substance into the copolymer salt (B), which may be used as a main ingredient for the cement admixture. As typical examples of the alkaline substance which is properly used herein, inorganic compounds such as hydroxides, chlorides, and carbonates of monovalent metals and divalent metals; ammonia; and organic amines may be cited.

The second copolymer ($A_1$) is derived from the composition using the monomers (a) and (c) and optionally the monomer (d) at the prescribed ratio mentioned above. As respects the mixing ratio of the monomers (a) and (c), the proportion of the monomer (a) is in the range of 5–65% by weight and that of the monomer (c) is in the range of 35–95% by weight, preferably that of the monomer (a) in the range of 5–60% by weight and that of the monomer (c) in the range of 40–95% by weight. The proportion of the monomer (d) copolymerizable with the monomers mentioned above is not more than 50% by weight, preferably not more than 30% by weight. If these proportions deviate from the ranges mentioned above, the produced cement dispersant will not acquire such highly satisfactory properties as are aimed at.

The third copolymer ($A_2$) is derived from the composition using the monomers (b) and (c) at the prescribed ratio mentioned above. As respects the mixing ratio of the monomers (b) and (c), the proportion of the monomer (b) is in the range of 65–95% by weight and that of the monomer (c) in the range of 5–35% by weight, preferably that of the monomer (b) in the range of 70–95% by weight and that of the monomer (c) in the range of 5–30% by weight. The proportion of the monomer (d) copolymerizable with the monomers mentioned above is not more than 50% by weight, preferably not more than 30% by weight. If these proportions deviate from the ranges mentioned above, the produced cement admixture will not acquire such highly satisfactory properties as are aimed at.

The second and the third copolymer ($A_1$ and $A_2$) and the second and the third copolymer salt ($B_1$ and $B_2$) mentioned above are prepared in the same manner as the first copolymer (A) and the first copolymer salt (B).

A weight average molecular weight of the copolymers (A, $A_1$ and $A_2$) and/or the copolymer salts (B, $B_1$ and $B_2$) which are used as the cement admixture of this invention properly are in the range of 500–500,000, preferably 5,000–300,000. If their molecular weights are less than 500, the disadvantage of the produced cement admixture being deficient in water reducing property will ensue. Conversely, if their weight average molecular weights exceed 500,000, the disadvantage of the produced cement admixture being deficient in water decreasing property and slump loss preventing property will ensue.

The first copolymer (A) and/or the copolymer salt (B) can be used independently of each other or together in the form of a mixture as a cement admixture. When the copolymer (A) and/or the copolymer salt (B) as a main ingredient is used in combination with other known cement admixture, this cement admixture can be selected from among cement dispersants, air entraining agents, cement wetting agents, expanding agents, waterproofing agents, retarding agents, accelerating agents, water-soluble polymeric substances, viscosity enhancing agents, flocculating agents, dry shrinkage diminishing agents, strength enhancing agents, and hardening accelerators defoamer, for example, which have been heretofore known to the art.

The second copolymer ($A_1$) and/or the copolymer salt ($B_1$) can be used in combination with the third copolymer ($A_2$) and/or the copolymer salt ($B_2$).

Further, the second copolymer ($A_1$) and/or the copolymer salt ($B_1$) can be used in combination with such known cement dispersants as naphthalene based dispersants, aminosulfonic acid based dispersants, polycarboxylic acid based dispersants, and lignin based dispersants.

The cement admixture to be used in this invention which excels in the slump retaining property has as a main ingredient thereof the polycarboxylic acid polymer ($A_3$) manifesting to a calcium sulfoaluminate type expansive additive an adsorption ratio of not less than 90% in 5 minutes at room temperature when added in an amount of 0.1% by weight as solids (based on the amount of the calcium sulfoaluminate based expansive additive) and/or the polymer salt ($B_3$) obtained by further neutralizing the polymer ($A_3$) with an alkaline substance.

The polymer ($A_3$) of this description is known in various forms including, for example, a copolymer derived from the composition using 35–95% by weight, preferably 40–95% by weight, of a carboxylic acid monomer (c) represented by the general formula (3), 5–65% by weight, preferably 5–60% by weight, of a first polyalkylene glycol (meth) acrylate (a) represented by the general formula (1), and 0–50% by weight, preferably 0–3 0% by weight, of a monomer (d) copolymerizable with the monomers mentioned above (providing that the total of the components (c), (a), and (d) is 100% by weight).

The polymer ($A_3$) and the polymer salt ($B_3$) can be prepared by the same method as the copolymers (A, $A_1$ and $A_2$) and the copolymer salts (B, $B_1$ and $B_2$).

The weight average molecular weights of the polymer and the polymer salt are the same as those of the copolymers and the salts thereof mentioned above.

The cement admixture of this invention can be used for hydraulic cements such as portland cement, belite high-content cement, alumina cement, and various mixed cements or gypsum and other hydraulic materials other than cement.

The cement admixture of this invention can manifest an outstanding effect even at a small application ratio as compared with the conventional cement admixture. For use in mortar or concrete which is prepared with hydraulic cement, for example, it suffices to add this cement admixture to the ingredients being blended at an application ratio in the range of 0.01–1.0%, preferably 0.02–0.5%, based on the weight of cement. The addition of this cement admixture brings about various advantageous effects such as, for example, accomplishment of high water reducing ratio, improvement in the slump loss preventing ability, decrease of the unit water content, exaltation of strength, and enhancement of durability. If the application ratio is less than 0.01%, the produced mortar or concrete will be deficient in performance. Conversely, if the application ratio exceeds 1.0%, the excess will produce no proportionate addition to the effect and will prove only wasteful from the economic point of view.

Although the cement composition of this invention is not limited in an amount of the cement to be used per/m3 of the cement composition and a unit water amount, the unit water amount is 120–185kg/m$^3$ and weight ratio of water/cement is 0.15–0.7, preferably the unit water amount is 120–175 kg/m$^3$ and the weight ratio of water/cement is 0.2–0.5. If necessary, an aggregate such as sand and gravel may be incorporated.

Generally, $C_3A$ has the highest hydrating speed in all the components of cement and manifests a hydrating ratio exceeding 30% within several minutes after addition of water. The phenomenon of decrease of mixing water induced by such sudden hydration as mentioned above may be one of the main causes for slump loss. The well-known dispersant is absorbed most quickly by the $C_3A$ of such high activity as mentioned above in all the components of cement. The fact that most of the dispersant is embedded in the crystals to be produced by the reaction of hydration of $C_3A$ and is gradually deprived of the cement dispersing power with the elapse of time is inferred to be another major cause for the slump loss. It is expected, therefore, that the slump loss will be decreased to a great extent by repressing the activity of $C_3A$.

The cement dispersing agent of this invention is not limited in any sense by such reasons as are adduced above.

Now, this invention will be described more specifically below with reference to working examples. In the examples, the term "%" refers to "% by weight" and the term "parts" to "parts by weight" unless otherwise specified.

EXAMPLE 1
Production of Cement Admixture (1)

In a reaction vessel made of glass provided with a thermometer, a stirrer, a dropping funnel, a nitrogen inlet tube, and a reflux condenser, 500 parts of water was placed, the air entrapped in the reaction vessel was displaced with nitrogen while the water was kept stirred meanwhile, and the stirred water was heated to 80° C. under the atmosphere of nitrogen. Then, an aqueous monomer solution obtained by mixing 300 parts of methoxy polyethylene glycol monomethacrylate (average addition number of mols, 4, of ethylene oxide), 200 parts of methacrylic acid, 150 parts of water, and 13.5 parts of 3-mercapto propionic acid as a chain transfer agent and 40 parts of an aqueous 10% ammonium persulfate solution were added dropwise to the hot water in the reaction vessel over a period of 4 hours. After the dropwise addition, 10 parts of an aqueous 10% ammonium persulfate solution was further added dropwise over a period of 1 hour. Then, the resultant mixture was kept continuously at a temperature of 80° C. for 1 hour to complete the reaction of polymerization and obtain a cement admixture (1) of this invention in the form of an aqueous polymer solution having a weight average molecular weight of 12300.

EXAMPLES 2 AND 3
Production of Cement Admixtures (2) and (3)

Cement admixtures (2) and (3) of this invention were produced by following the procedure of Example 1. The details of the production are shown in Table 1.

EXAMPLE 4
Production of Cement Admixture (4)

In a reaction vessel made of glass provided with a thermometer, a stirrer, a dropping funnel, a nitrogen inlet tube, and a reflux condenser, 500 parts of water was placed, the air entrapped in the reaction vessel was displaced with nitrogen while the water was kept stirred meanwhile, and the stirred water was heated to 80° C. under the atmosphere of nitrogen. Then, an aqueous monomer solution obtained by mixing 400 parts of methoxy polyethylene glycol monomethacrylate (average addition number of mols, 4, of ethylene oxide), 100 parts of methacrylic acid, 150 parts of water, and 5.7 parts of 3mercapto propionic acid as a chain transfer agent and 40 parts of an aqueous 10% ammonium persulfate solution were added dropwise to the hot water in the reaction vessel over a period of four hours. After the dropwise addition, 10 parts of an aqueous 10% ammonium persulfate solution was further added dropwise over a period of one hour. Then, the resultant mixture was kept continuously at a temperature of 80° C. for one hour to complete the reaction of polymerization and obtain a cement admixture (4) in the form of an aqueous polymer solution having a weight average molecular weight of 28700.

EXAMPLE 5
Production of Cement Admixture (5)

A cement admixture (5) was produced by following the procedure of Example 4. The details of the production are shown in Table 1.

EXAMPLE 6–10
Test for Adsorption Ratio

The test was conducted by the following procedure using a calcium sulfoaluminate based expansive additive (produced by Denki Kagaku Kogyo Co., Ltd. and marketed under trademark designation of "Denka CSA 100R").

(1) In a beaker, an aqueous polymer solution as the cement admixture (1) was placed until a target concentration of 0.2% (amount in % by weight of the cement admixture as solids based on the amount of the calcium sulfoaluminate based expansive additive) and water was additionally placed in an amount calculated to set the water/calcium sulfoaluminate type expansive additive ratio at 0.6.

(2) Then, the calcium sulfoaluminate based expansive additive was added in a prescribed amount to the diluted cement admixture in the beaker, stirred for 1 minutes, and then filtered. The resultant filtrate was collected.

(3) The steps (1) and (2) were repeated, with the stirring time changed to 3 and 5 minutes.

TABLE 1

| | Designation | Kind of copolymer | First polyalkylene glycol (meth)acrylate (a) | Second polyalkylene glycol (meth)acrylate (b) | Carboxylic acid monomer (c) | Molecular weight |
|---|---|---|---|---|---|---|
| Example 1 | Cement admixtuxe (1) | Second copolymer | MPGMA(n = 4) (60) | | MAA(40) | 12300 |
| Example 2 | Cement admixture (2) | Second copolymer | MPGMA(n = 4) (40) | | MAA(60) | 15000 |
| Example 3 | Cement admixture (3) | First copolymer | MPGMA(n = 4) (50) | MPGMA(n = 23) (10) | MAA(40) | 16000 |
| Example 4 | Cement admixture (4) | Third copolymer | MPGMA(n = 4) (80) | | MAA(20) | 28700 |
| Example 5 | Cement admixture (5) | Third copolytner | MPGMA(n = 9) (80) | | MAA(20) | 25000 |

MPGMA: Methoxy polyethylene glycol monomethacrylate
MAA: Methacrylic acid (4) The filtrates consequently obtained were severally tested for polymer concentration with an RI spectrophotometer.

(5) The steps (1) through (4) were repeated with respect to the aqueous polymer solutions of the cement admixtures (2)–(5).

(6) The adsorption ratio of polymer was determined on the basis of the following definition.

Adsorption ratio (%)=[(Target polymer concentration -residual polymer concentration in filtrate)/(Target polymer concentration)]×100

The adsorption ratio is 100 when the whole added polymer is adsorbed on the calcium sulfoaluminate based expansive additive. The results of the test for adsorption ratio are shown in Table 2.

TABLE 2

| | | Adsorption ratio (%) | | |
|---|---|---|---|---|
| | Designation | 1 minutes after start of test | 3 minutes after start of test | 5 minutes after start of test |
| Example 6 | Cement admixture (1) | 92 | 100 | |
| Example 7 | Cement admixture (2) | 84 | 93 | 100 |
| Example 8 | Cement admixture (3) | 82 | 95 | 100 |
| Example 9 | Cement admixture (4) | 35 | 51 | 56 |
| Example 10 | Cement admixture (5) | 42 | 62 | 68 |

It is clearly noted from Table 2 that the polymers of the cement admixtures (1) through (3) of this invention were quickly adsorbed to the calcium sulfoaluminate based expansive additive within 5 minutes, whereas the polymers of the cement admixtures (4) and (5) were adsorbed slowly thereto.

EXAMPLES 11–13 AND CONTROLS 1–2

Mortar Test 1

The aqueous polymer solutions of the cement admixtures (1)–(3) of this invention used in combination with a polycarboxylic acid based dispersing agent (produced by Nippon Shokubai Co., Ltd. and marketed under trademark designation of "Aqualock FC-600"; hereinafter referred to as "PC agent 1") (Examples 11–13) and the aqueous polymer solutions of the cement admixtures (4) and (5) used in combination with a PC agent 1 (Controls 1–2) were compared for time-course change of the mortar flow value.

The mortar used for the test was composed of 800 g of cement (produced by Chichibu-Onoda Cement Co., Ltd. and marketed under trademark designation of "High-flow Cement"), 80 g of the calcium sulfoaluminate based expansive additive, 400 g of Toyoura standard sand, and 220 g of water containing a polymer sample.

The mortar composition was prepared by mechanically mortar mixer and packing a hollow cylinder, 55 mm in diameter and 55 mm in height, held erect on a table with the resultant mixture. Then, the cylinder was lifted vertically and the mortar was consequently spread on the table. The spread mortar was measured for diameter in two directions and the average of the two values of measurement was reported as the flow value. Thereafter, the whole amount of the mortar was left standing in a tightly closed container for a prescribed time and then subjected to the same procedure as mentioned above to find the time-course change of flow value. The results are shown in Table 3.

TABLE 3

| | Cement admixture used | Amount added* (% by weight) | Flow value (mm) | | |
|---|---|---|---|---|---|
| | | | Immediately after start of test | 30 minutes after start of test | 60 minutes after start of test |
| Example 11 | Cement admixture (1) + PC agent 1** | 0.06 + 0.12 | 164 | 178 | 161 |
| Example 12 | Cement admixture (2) + PC agent 1 | 0.06 + 0.12 | 160 | 163 | 157 |
| Example 13 | Cement admixture (3) + PC agent 1 | 0.06 + 0.12 | 163 | 160 | 160 |
| Control 1 | Cement admixture (4) + PC agent 1 | 0.06 + 0.12 | 160 | 123 | 115 |
| Control 2 | Cement admixture (5) + PC agent 1 | 0.06 + 0.12 | 162 | 121 | 106 |

*Percent by weight of solid content to cement
**PC agent 1: Third copolymer

It is clearly noted from Table 3 that the flow values obtained of the polymers of the cement admixtures (1)–(3) of this invention used in combination with the PC agent 1 showed extremely small decreases after 30 and 60 minutes as compared with the flow values obtained of the polymers of the cement admixtures (4) and (5), indicating that the Thereafter, the whole amount of the mortar was left standing in a tightly closed container for a prescribed time and then subjected to the same procedure as mentioned above to find the time-course change of flow value. The results are shown in Table 4.

TABLE 4

|  | Cement admixture used | Amount added*a) (% by weight) | Flow value (mm) | | | |
| --- | --- | --- | --- | --- | --- | --- |
|  |  |  | Immediately after start of test | 30 minutes after start of test | 60 minutes after start of test | 90 minutes after start of test |
| Example 14 | Cement admixture (1)**b) + PC agent 2c) | 0.08 + 0.08 | 107 | 106 | 104 | 98 |
| Example 15 | Cement admixture (1) + NSFd) | 0.9 + 0.1 | 104 | 107 | 107 | 97 |
| Control 3 | PC agent 2 | 0.12 | 107 | 93 | 81 | 70 |
| Control 4 | NSF | 0.9 | 103 | 94 | 90 | 70 | a)Percent by weight of solid content to cement
b)Cement admixture: Second copolymer
c)PC agent 2: Third copolymer
d)NSF: naphthalene sulfornic acid-form aldehyde condensate cement admixtures of this invention manifested an outstanding effect in lowering the slump loss.

EXAMPLES 14–15 AND CONTROLS 3–4

Mortar Test 2

The aqueous polymer solution of the cement admixture (1) of this invention used in combination with a polycarboxylic acid based dispersing agent [a copolymer composed of methoxy polyethylene glycol monomethacrylate (average addition number of mols, 25, of ethylene oxide) and methacrylic acid at a weight ratio of 83.4/16.4 and having a weight average molecular weight of 22000; hereinafter referred to as "PC agent 2")] (Example 10), and the aqueous polymer solution of the cement admixture (1) of this invention used in combination with a naphthalene sulfonic acid-form aldehyde condensate (produced by Kao Co., Ltd. and marketed under trademark designation of "Mighty 150"; hereinafter referred to as "NSF") (Example 11), and the use of the "PC agent 2" and NSF separately (Controls 3–4) were compared for time-course change of mortar flow value.

The mortar used in the test was composed of 600 g of ordinary portland cement (produced by Chichibu-Onoda Cement Co., Ltd.), 600 g of Toyoura standard sand, and 210 g of water containing a given polymer sample.

The mortar was prepared by mechanically mixing a given motor composition with a mortar mixer and packing a hollow cylinder, 55 mm in diameter and 55 mm in height, held erect on a table with the resultant mixture. Then, the cylinder was lifted vertically and the mortar was consequently spread on the table. The spread mortar was measured for diameter in two directions and the average of the two values of measurement was reported as the flow value.

It is clearly noted from Table 4 that the cement admixture (1) of this invention used in combination with a polycarboxlic acid based dispersing agent and NSF showed an extremely small decrease of the flow value than sparately use of the polycarboxylic acid and NSF. This fact indicates that the cement admixture of this invention manifested an outstanding effect in decreasing the slump loss.

EXAMPLE 16

Production of Cement Admixture (6)

In a reaction vessel made of glass provided with a thermometer, a stirrer, a dropping funnel, a nitrogen inlet tube, and a reflux condenser, 500 parts of water was placed, the air entrapped in the reaction vessel was displaced with nitrogen while the water was kept stirred meanwhile, and the stirred water was heated to 80° C. under the atmosphere of nitrogen. Then, an aqueous monomer solution obtained by mixing 50 parts of methoxy polyethylene glycol monomethacrylate (average addition number of mols, 4, of ethylene oxide), 350 parts of methoxy polyethylene glycol monomethacrylate (average addition number of mols, 23, of ethylene oxide), 100 parts of methacrylic acid, 150 parts of water, and 2.8 parts of 3-mercaptopropionic acid as a chain transfer agent and 40 parts of an aqueous 10% ammonium persulfate solution were added dropwise to the hot water in the reaction vessel over a period of 4 hours. After the dropwise addition, 10 parts of an aqueous 10% ammonium persulfate solution was further added dropwise over a period of 1 hour. Then, the resultant mixture was kept continuously at a temperature of 80° C. for 1 hour to complete the reaction of polymerization and obtain a cement admixture (6) of this invention in the form of an aqueous polymer solution having a weight average molecular weight of 22000.

EXAMPLES 17–22
Production of Cement Admixtures (7)–(12)

Cement admixtures (7)–(12) according to this invention were produced by following the procedure of Example 16. The details of the production are collectively shown in Table 5.

A cement admixtures (2)–(3) for comparison were produced by following the procedure of Control 5. The details of this production are shown in Table 5.

EXAMPLES 23–29 AND CONTROLS 8–10
Mortar Test 3

TABLE 5

| Designation | | Kind of copolymer | First polyalkylene glycol (meth)acrylate (a) | Second polyalkylene glycol (meth)acrylate (b) | Carboxylic acid monomer (c) | Other monomer (d) | Molecular weight |
|---|---|---|---|---|---|---|---|
| Example 16 | Cement admixture (6) | A | MPGMA(n = 4) (10) | MPGMA(n = 23) (70) | MAA(20) | | 22000 |
| Example 17 | Cement admixture (7) | A | MPGMA(n = 4) (20) | MPGMA(n = 23) (60) | MAA(20) | | 21000 |
| Example 18 | Cement admixture (8) | A | MPGMA(n = 4) (30) | MPGMA(n = 23) (55) | MAA(20) | | 20500 |
| Example 19 | Cement admixture (9) | A | MPGMA(n = 4) (20) | MPGMA(n = 23) (55) | MAA(20) | | 21500 |
| Example 20 | Cement admixture (10) | A | MPGMA(n = 4) (30) | MPGMA(n = 23) (45) | MAA(25) | | 22000 |
| Example 21 | Cement admixture (11) | A | MPGMA(n = 4) (10) | MPGMA(n = 23) (65) | MAA(20) | EMA(5) | 24000 |
| Example 22 | Cement admixture (12) | A | MPGMA(n = 4) (10) | MPGMA(n = 23) (60) | MAA(20) | EMA(10) | 21000 |
| Control 5 | Cement admixture (1) for comparison | — | MPGMA(n = 4) (2) | MPGMA(n = 23) (78) | MAA(20) | | 2300. |
| Control 6 | Cement admixture (2) for comparison | $A_2$ | | MPGMA(n = 23) (80) | MAA(20) | | 22800 |
| Control 7 | Cement admixture (3) for comparison | — | MPGMA(n = 4) (20) | MPGMA(n = 150) (60) | MAA(20) | | 48000 |

MPGMA: Methoxy polyethylene glycol monomethacrylate
MAA: Methacrylic acid
EMA: Methyl methacrylate
A: First copolymer
$A_2$: Third copolymer

CONTROL 5
Production of Cement Admixture (1) for Comparison

In a reaction vessel made of glass provided with a thermometer, a stirrer, a dropping funnel, a nitrogen inlet tube, and a reflux condenser, 500 parts of water was placed, the air entrapped in the reaction vessel was displaced with nitrogen while the water was kept stirred meanwhile, and the stirred water was heated to 80° C. under the atmosphere of nitrogen. Then, an aqueous monomer solution obtained by mixing 10 parts of methoxy polyethylene glycol monomethacrylate (average addition number of mols, 4, of ethylene oxide), 390 parts of methoxy polyethylene glycol monomethacrylate (average addition number of mols, 23, of ethylene oxide), 100 parts of methacrylic acid, 150 parts of water, and 2.6 parts of 3-mercaptopropionic acid as a chain transfer agent and 40 parts of an aqueous 10% ammonium persulfate solution were added dropwise to the hot water in the reaction vessel over a period of 4 hours. After the dropwise addition, 10 parts of an aqueous 10% ammonium persulfate solution was further added dropwise over a period of 1 hour. Then, the resultant mixture was kept continuously at a temperature of 80° C. for 1 hour to complete the reaction of polymerization and obtain a cement admixture (1) for comparison in the form of an aqueous polymer solution having a weight average molecular weight of 23000.

CONTROLS 6–7
Production of Cement Admixtures (2)–(3) for Comparison

Mortar samples severally including the cement admixtures (6)–(12) (Examples 23–29) of this invention and the cement admixtures (1)–(3) for comparison (Controls 8–10) shown in Table 5 were tested for time-course change of flow value.

The mortar samples used herein were each composed of 800 g of cement (produced by Chichibu-Onoda Cement Co., Ltd. and marketed under trademark designation of "High-flow Cement"), 400 g of Toyoura standard sand, and 220 g of water containing a given polymer sample.

The mortar was prepared by mechanically mixing a given motor composition with a mortar mixer and packing a hollow cylinder, 55 mm in diameter and 55 mm in height, held erect on a table with the resultant mixture. Then, the cylinder was lifted vertically and the mortar was consequently spread on the table. The spread mortar was measured for diameter in two directions and the average of the two values of measurement was reported as the flow value. Thereafter, the whole amount of the mortar was left standing in a tightly closed container for a prescribed time and then subjected to the same procedure as mentioned above to find the time-course change of flow value. The results are shown in Table 6.

TABLE 6

| | Cement admixture used | Amount added[a] (% by weight) | Flow value (mm) | | |
|---|---|---|---|---|---|
| | | | Immediately after start of test | 30 minutes after start of test | 60 minutes after start of test |
| Example 23 | Cement admixture (6) | 0.06 | 144 | 143 | 135 |
| Example 24 | Cement admixture (7) | 0.22 | 145 | 157 | 160 |

TABLE 6-continued

| | Cement admixture used | Amount added[a] (% by weight) | Flow value (mm) | | |
| --- | --- | --- | --- | --- | --- |
| | | | Immediately after start of test | 30 minutes after start of test | 60 minutes after start of test |
| Example 25 | Cement admixture (8) | 0.28 | 138 | 163 | 156 |
| Example 26 | Cement admixture (9) | 0.16 | 150 | 166 | 174 |
| Example 27 | Cement admixture (10) | 0.2 | 154 | 160 | 156 |
| Example 28 | Cement admixture (11) | 0.2 | 142 | 146 | 140 |
| Example 29 | Cement admixture (12) | 0.16 | 150 | 165 | 174 |
| Control 8 | Cement admixture (1) for comparison | 0.15 | 140 | 122 | 100 |
| Control 9 | Cement admixture (2) for comparison | 0.15 | 142 | 121 | 102 |
| Control 10 | Cement admixture (3) for comparison | 0.18 | 140 | 112 | 91 |

[a]Percent by weight of solid content to cement.

EXAMPLES 30–36 AND CONTROLS 11–12
Concrete Test

In the production of concrete samples, ordinary portland cement (Chichibu-Onoda Cement, specific gravity 3.16) was used as cement, land sand produced along Oi river (specific gravity 2,62, FM 2.71) as fine aggregate, and crused sand stones produced in Oume (specific gravity 2.64, MS 20 mm) as coarse aggregate.

The cement admixtures (6)–(12) (Examples 30–36) according to this invention and the cement admixtures (1) and (2) for comparison (Controls 11–12) were used as a cement dispersing agent. The amount of air entrained in the concrete was adjusted by the use of a commercially available defoaming agent.

As respects the conditions for concrete production, the unit cement content was 660 kg/m$^3$, the unit water content 165 kg/m$^3$, and the fine aggregate ratio 40.3%.

The concrete samples were produced under the conditions mentioned above and were tested for slump and air entrainment in accordance with the Japanese Industrial Standard (JIS A 1101 and 1128). The results are shown in Table 7.

It is clearly noted from Table 6 and Table 7 that the flow values obtained of the mortar samples and the concrete samples including the cement admixtures according to this invention showed conspicuously repressed flow loss after 30 and 60 minutes, indicating that the cement admixtures of this invention manifested an outstanding effect in lowering slump loss.

The entire disclosure of each of Japanese Patent Application No. 8-34951 filed on Feb. 22, 1996 and Japanese Patent Application No. 8-34952 filed on Feb. 22, 1996 including specification, claims and summary are incorporated herein by reference in its entirety.

What is claimed is:

1. A cement composition excelling in the slump retaining property which comprises at least a cement admixture comprising as a main ingredient thereof a first copolymer (A) derived from the composition of 5–90% by weight of a first polyalkylene glycol (meth)acrylate (a) represented by the general formula (1)

TABLE 7

| | Cement admixture used | Amount added[a] (% by weight) | Flow value (mm) | | |
| --- | --- | --- | --- | --- | --- |
| | | | Immediately after start of test | 30 minutes after start of test | 60 minutes after start of test |
| Example 30 | Cement admixture (6) | 0.21 | 655(1.2) | 658(1.2) | 603(1.1) |
| Example 31 | Cement admixture (7) | 0.25 | 650(1.5) | 652(1.4) | 628(1.4) |
| Example 32 | Cement admixture (8) | 0.48 | 625(1.3) | 680(1.3) | 733(1.2) |
| Example 33 | Cement admixture (9) | 0.22 | 580(1.3) | 525(1.3) | 500(1.3) |
| Example 34 | Cement admixture (10) | 0.325 | 730(1.0) | 718(0.9) | 705(0.9) |
| Example 35 | Cement admixture (11) | 0.2 | 605(1.1) | 578(1.1) | 530(1.0) |
| Example 36 | Cement admixture (12) | 0.22 | 620(1.2) | 610(1.1) | 600(1.0) |
| Control 11 | Cement admixture (1) for comparison | 0.19 | 605(1.0) | 520(1.1) | 448(0.9) |
| Control 12 | Cement admixture (2) for comparison | 0.2 | 610(1.2) | 532(1.1) | 450(1.1) |

[a]Weight percent of solid content to cement

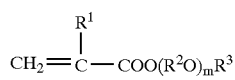

wherein $R^1$ is hydrogen atom or methyl group, $R^2O$ is an oxyalkylene group of 2–4 carbon atoms or a mixture of two or more oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mole of oxyalkylene groups and represents an integer in the range of 1–97, 5–90% by weight of a second polyalkylene glycol (meth) acrylate (b) represented by the general formula (2)

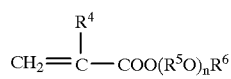

wherein $R^4$ is hydrogen atom or methyl group, $R^5O$ is an oxyalkylene group of 2–4 carbon atoms or a mixture of two or more such oxyalkylene groups and, in the case of a mixture of two or more oxyalkylene groups, these groups may be added in a block form or a random form, $R^6$ is hydrogen atom or an alkyl group having 1–22 carbon atoms, and n is the average addition number of mols of oxyalkylene groups, and represents an integer in the range of 4–100, and is greater than m by 3 or more, 5–90% by weight of a carboxylic acid monomer (c) represented by the general formula (3)

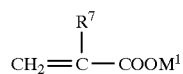

wherein $R^7$ is hydrogen atom or methyl group, and $M^1$ is hydrogen atom, a monovalent metal atom, a divalent metal atom, an ammonium group, or an organic amine group, and 0–50% by weight of other monomer (d) copolymerizable with said monomers (providing that the total of said components (a), (b), (c), and (d) is 100% by weight) or a first copolymer salt (B) obtained by further neutralizing said copolymer (A) with an alkaline substance; cement; and water.

2. A cement composition according to claim 1, wherein an amount of said cement admixture is 0.01–1.0% by weight to cement and weight ratio of water/cement is 0.15 to 0.7.

3. A cement composition excelling in the slump retaining property which comprises at least a cement admixture comprising as a main ingredient thereof a mixture of second copolymer ($A_1$) derived from the composition of 5–65% by weight of a first polyalkylene glycol (meth)acrylate (a) represented by the general formula (1)

wherein $R^1$ is hydrogen atom or methyl group, $R^2O$ is an oxyalkylene group of 2–4 carbon atoms or a mixture of two or more oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mole of oxyalkylene groups and represents an integer in the range of 1–97, 35–95% by weight of a carboxylic acid monomer (c) represented by the general formula (3)

wherein $R^7$ is hydrogen atom or methyl group, and $M^1$ is hydrogen atom, a monovalent metal atom, a divalent metal atom, an ammonium group, or an organic amine group, 0–50% by weight of other monomer (d) copolymerizable with said monomers (providing that the total of said components (a), (c), and (d) is 100% by weight) or a second copolymer salt ($B_1$) obtained by further neutralizing said copolymer ($A_1$) with an alkaline substance with a third copolymer ($A_2$) derived from the composition of 65–95% by weight of a second polyalkylene glycol (meth)acrylate (b) represented by the general formula (2)

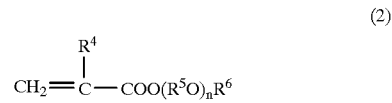

wherein $R^4$ is hydrogen atom or methyl group, $R^5O$ is an oxyalkylene group of 2–4 carbon atoms or a mixture of two or more such oxyalkylene groups and, in the case of a mixture of two or more oxyalkylene groups, these groups may be added in a block form or a random form, $R^6$ is hydrogen atom or an alkyl group having 1–22 carbon atoms, and n is the average addition number of mols of oxyalkylene groups and represents an integer in the range of 4–100, and is greater than m by 3 or more, 5–35% by weight of a carboxylic acid monomer (c) represented by the general formula (3)

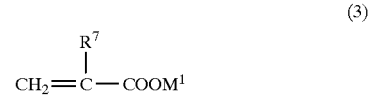

wherein $R^7$ is hydrogen atom or methyl group, and $M^1$ is hydrogen atom, a monovalent metal atom, a divalent metal atom, an ammonium group, or an organic amine group, and 0–50% by weight of other monomer (d) copolymerizable with said monomers (providing that the total of said components (b), (c), and (d) is 100% by weight) or a third copolymer salt ($B_2$) obtained by further neutralizing said copolymer ($A_2$) with an alkaline substance; cement; and water.

4. A cement composition according to claim 3, wherein an amount of said cement admixture is 0.01–1.0% by weight to cement and a weight ratio of water/cement is 0.15 to 0.7.

5. A cement composition according to claim 3, wherein the weight ratio of said copolymer (salt) ($A_1$ or $B_1$) to said copolymer (salt) ($A_2$ or $B_2$) is in the range of 1:99–99:1.

6. A cement composition excelling in the slump retaining property which comprises at least a cement admixture comprising as a main ingredient thereof a second copolymer ($A_1$) derived from the composition of 5–65% by weight of a first polyalkylene glycol (meth)acrylate (a) represented by the general formula (1)

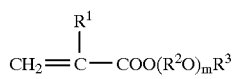
(1)

wherein $R^1$ is hydrogen atom or methyl group, $R^2O$ is an oxyalkylene group of 2–4 carbon atoms or a mixture of two or more oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mole of oxyalkylene groups and represents an integer in the range of 1–97, 35–95% by weight of a carboxylic acid monomer (c) represented by the general formula (3)

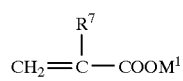
(3)

wherein $R^7$ is hydrogen atom or methyl group, and $M^1$ is hydrogen atom, a monovalent metal atom, a divalent metal atom, an ammonium group, or an organic amine group, and 1–50% by weight of other monomer (d) copolymerizable with said monomers (providing that the total of said components (a), (c), and (d) is 100% by weight) or a second copolymer salt ($B_1$) obtained by further neutralizing said copolymer ($A_1$) with an alkaline substance and at least one kind of cement dispersant selected from the group consisting of a naphthalene containing dispersant, an aminosulfonic acid containing dispersant, a polycarboxylic acid containing dispersant, and a lignin containing dispersant; cement; and water.

7. A cement composition according to claim 6, wherein an amount of said cement admixture is 0.01–1.0% by weight to cement and a weight ratio of water/cement is 0.15 to 0.7.

8. A cement composition according to claim 6, wherein the weight ratio of said copolymer (salt) ($A_1$ or $B_1$) to said cement dispersant is in the range of 1:99–99:1.

9. A cement composition excelling in the slump retaining property which comprises at least a cement admixture comprising as a main ingredient thereof a polycarboxylic acid polymer ($A_3$) manifesting to a calcium sulfoaluminate based expansive additive an adsorption ratio of not less than 90% in 5 minutes at room temperature when said polymer added in an amount of 0.1% by weight as solids (based on the amount of said calcium sulfoaluminate type expansive additive) or a polymer salt ($B_3$) obtained by further neutralizing said polymer ($A_3$) with an alkaline substance; and at least one kind of cement dispersant selected from the group consisting of a naphthalene based dispersant, an aminosulfonic acid based dispersant, a polycarboxylic acid based dispersant, and a lignin based dispersant; cement; and water.

10. A cement composition according to claim 9, wherein an amount of said cement admixture is 0.01 to 1.0% by weight and a weight ratio of water/cement is 0.15 to 0.7.

11. A cement composition of claim 1, wherein m is between 1 and 10, inclusively, and n is between 11 and 100, inclusively.

12. A cement composition of claim 11, wherein n is greater than m by 19 or more.

13. A cement composition of claim 1, wherein $R^2O$ is an oxyethylene group.

14. A cement composition excelling in the slump retaining property which comprises at least a cement admixture comprising as a main ingredient thereof a first copolymer (A) derived from the composition of a first polyalkylene glycol (meth)acrylate (a) represented by the general formula (1)

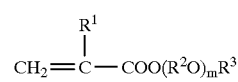
(1)

wherein $R^1$ is hydrogen atom or methyl group, $R^2O$ is an oxyethylene group, $R^3$ is hydrogen atom or an alkyl group having 1–22 carbon atoms, and m is the average addition number of mols of oxyalkylene groups and represents an integer in the range of 1–97, a second polyalkylene glycol (meth)acrylate (b) represented by the general formula (2)

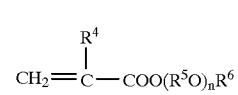
(2)

wherein $R^4$ is hydrogen atom or methyl group, $R^5O$ is an oxyethylene group, $R^6$ is hydrogen atom or an alkyl group having 1–22 carbon atoms, and n is the average addition number of mols of oxyethylene group, and represents an integer in the range of 4–100, and is greater than m by 3 or more, a carboxylic acid monomer (c) represented by the general formula (3)

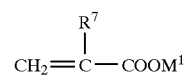
(3)

wherein $R^7$ is hydrogen atom or methyl group, and $M^1$ is hydrogen atom, a monovalent metal atom, a divalent metal atom, an ammonium group, or an organic amine group, and an ester of (meth)acrylic acid with an aliphatic alcohol having 1 to 18 carbon atoms (d) or a first copolymer salt (B) obtained by further neutralizing said copolymer (A) with an alkaline substance; cement; and water.

15. A cement composition according to claim 14, wherein an amount of said cement admixture is 0.01∫1.0% by weight to cement and weight ratio of water/cement is 0.15 to 0.7.

16. A cement composition of claim 14, wherein m is between 1 and 10, inclusively, and n is between 11 and 100, inclusively.

17. A cement composition of claim 16, wherein n is greater than m by 19 or more.

18. A cement composition according to claim 9, wherein an amount of said cement admixture is 0.01 to 1.0% by weight and a weight ratio of water/cement is 0.15 to 0.7.

19. A cement composition excelling in the slump retaining property which comprises at least a cement admixture comprising as a main ingredient thereof a polycarboxylic acid polymer ($A_3$) manifesting to a calcium sulfoaluminate based expansive additive an adsorption ratio of not less than 90% in 5 minutes at room temperature when said polymer added in an amount of 0.1% by weight as solids (based on the amount of said calcium sulfoaluminate type expansive additive) or a polymer salt ($B_3$) obtained by further neutralizing said polymer ($A_3$) with an alkaline substance; and at least one kind of cement dispersant selected from the group consisting of a naphthalene based dispersant, an aminosulfonic acid based dispersant, a polycarboxylic acid based dispersant, and a lignin based dispersant; cement; and water; wherein said polycarboxylic acid polymer ($A_3$) is derived from the composition of 5–90% by weight of a first polyalkylene glycol (meth)acrylate (a) represented by the general formula (1)

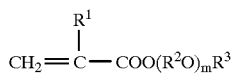
(1)

wherein $R^1$ is hydrogen atom or methyl group, $R^2O$ is an oxyalkylene group of 2–4 carbon atoms or a mixture of two or more oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mole of oxyalkylene groups and represents an integer in the range of 1–97, 5–90% by weight of a second polyalkylene glycol (meth) acrylate (b) represented by the general formula (2)

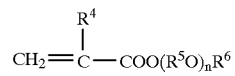
(2)

wherein $R^4$ is hydrogen atom or methyl group, $R^5O$ is an oxyalkylene group of 2–4 carbon atoms or a mixture of two or more such oxyalkylene groups and, in the case of a mixture of two or more oxyalkylene groups, these groups may be added in a block form or a random form, $R^6$ is hydrogen atom or an alkyl group having 1–22 carbon atoms, and n is the average addition number of mols of oxyalkylene groups, and represents an integer in the range of 4–100, and is greater than m by 3 or more, 5–90% by weight of a carboxylic acid monomer (c) represented by the general formula (3)

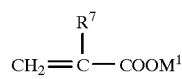
(3)

wherein $R^7$ is hydrogen atom or methyl group, and $M^1$ is hydrogen atom, a monovalent metal atom, a divalent metal atom, an ammonium group, or an organic amine group, and 0–50% by weight of other monomer (d) copolymerizable with said monomers (providing that the total of said components (a), (b), (c), and (d) is 100% by weight); or is a salt derived by further neutralization with an alkaline substance.

20. A cement composition excelling in the slump retaining property which comprises at least a cement admixture comprising as a main ingredient thereof a polycarboxylic acid polymer ($A_3$) manifesting to a calcium sulfoaluminate based expansive additive an adsorption ratio of not less than 90% in 5 minutes at room temperature when said polymer added in an amount of 0.1% by weight as solids (based on the amount of said calcium sulfoaluminate type expansive additive) or a polymer salt ($B_3$) obtained by further neutralizing said polymer ($A_3$) with an alkaline substance; and at least one kind of cement dispersant selected from the group consisting of a naphthalene based dispersant, an aminosulfonic acid based dispersant, a polycarboxylic acid based dispersant, and a lignin based dispersant; cement; and water; wherein said polycarboxylic acid polymer ($A_3$) is derived from the composition of 5–65% by weight of a first polyalkylene glycol (meth)acrylate (a) represented by the general formula (1)

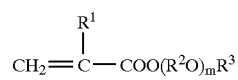
(1)

wherein $R^1$ is hydrogen atom or methyl group, $R^2O$ is an oxyalkylene group of 2–4 carbon atoms or a mixture of two or more oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mole of oxyalkylene groups and represents an integer in the range of 1–97, 35–95% by weight of a carboxylic acid monomer (c) represented by the general formula (3)

$$\begin{array}{c} R^7 \\ | \\ CH_2=C-COOM^1 \end{array}$$
(3)

wherein $R^7$ is hydrogen atom or methyl group, and $M^1$ is hydrogen atom, a monovalent metal atom, a divalent metal atom, an ammonium group, or an organic amine group, 0–50% by weight of other monomer (d) copolymerizable with said monomers (providing that the total of said components (a), (c), and (d) is 100% by weight); or is derived by further neutralization with an alkaline substance with a third copolymer ($A_2$) derived from the composition of 65–95% by weight of a second polyalkylene glycol (meth)acrylate (b) represented by the general formula (2)

$$\begin{array}{c} R^4 \\ | \\ CH_2=C-COO(R^5O)_nR^6 \end{array}$$
(2)

wherein $R^4$ is hydrogen atom or methyl group, $R^5O$ is an oxyalkylene group of 2–4 carbon atoms or a mixture of two or more such oxyalkylene groups and, in the case of a mixture of two or more oxyalkylene groups, these groups may be added in a block form or a random form, $R^6$ is hydrogen atom or an alkyl group having 1–22 carbon atoms, and n is the average addition number of mols of oxyalkylene groups and represents an integer in the range of 4–100, and is greater than m by 3 or more, 5–35% by weight of a carboxylic acid monomer (c) represented by the general formula (3)

$$CH_2=\underset{\underset{R^7}{|}}{C}-COOM^1 \tag{3}$$

wherein $R^7$ is hydrogen atom or methyl group, and $M^1$ is hydrogen atom, a monovalent metal atom, a divalent metal atom, an ammonium group, or an organic amine group, and 0–50% by weight of other monomer (d) copolymerizable with said monomers (providing that the total of said components (b), (c), and (d) is 100% by weight); or a third copolymer salt ($B_2$) obtained by further neutralizing said copolymer ($A_2$) with an alkaline substance.

21. A cement composition excelling in the slump retaining property which comprises at least a cement admixture comprising as a main ingredient thereof a polycarboxylic acid polymer ($A_3$) manifesting to a calcium sulfoaluminate based expansive additive an adsorption ratio of not less than 90% in 5 minutes at room temperature when said polymer added in an amount of 0.1% by weight as solids (based on the amount of said calcium sulfoaluminate type expansive additive) or a polymer salt ($B_3$) obtained by further neutralizing said polymer ($A_3$) with an alkaline substance; and at least one kind of cement dispersant selected from the group consisting of a naphthalene based dispersant, an aminosulfonic acid based dispersant, a polycarboxylic acid based dispersant, and a lignin based dispersant; cement; and water; wherein said polycarboxylic acid polymer ($A_3$) is derived from the composition of 5–65% by weight of a first polyalkylene glycol (meth)acrylate (a) represented by the general formula (1)

$$CH_2=\underset{\underset{R^1}{|}}{C}-COO(R^2O)_mR^3 \tag{1}$$

wherein $R^1$ is hydrogen atom or methyl group, $R^2O$ is an oxyalkylene group of 2–4 carbon atoms or a mixture of two or more oxyalkylene groups and, in the case of a mixture of two or more oxyalkylene groups, these groups may be added in a block form or a random form, $R^3$ is hydrogen atom or an alkyl group having 1–22 carbon atoms, and m is the average addition number of mole of oxyalkylene groups and represents an integer in the range of 1–97, 35–95% by weight of a carboxylic acid monomer (c) represented by the general formula (3)

$$CH_2=\underset{\underset{R^7}{|}}{C}-COOM^1 \tag{3}$$

wherein $R^7$ is hydrogen atom or methyl group, and $M^1$ is hydrogen atom, a monovalent metal atom, a divalent metal atom, an ammonium group, or an organic amine group, and 0–50% by weight of other monomer (d) copolymerizable with said monomers (providing that the total of said components (a), (c), and (d) is 100% by weight); or is a salt derived by further neutralization with an alkaline substance.

* * * * *